Feb. 9, 1960 H. A. RAHMEL 2,924,496
SYSTEM AND APPARATUS FOR DETERMINING THE LISTENING OR VIEWING HABITS OF WAVE SIGNAL RECEIVER USERS
Filed April 27, 1956
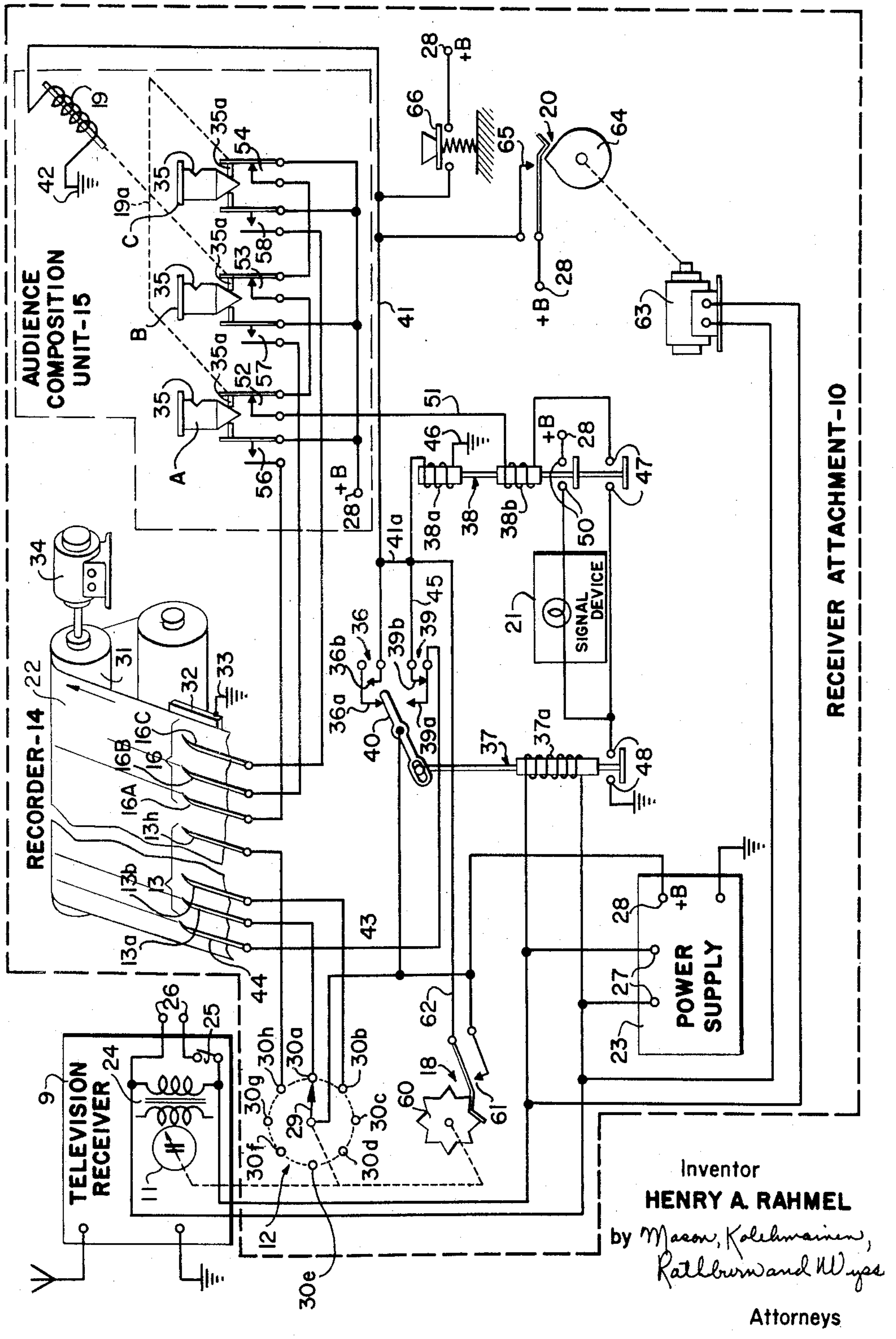
Inventor
HENRY A. RAHMEL
by Mason, Kolehmainen, Rathburn and Wyss
Attorneys 2,924,496

SYSTEM AND APPARATUS FOR DETERMINING THE LISTENING OR VIEWING HABITS OF WAVE SIGNAL RECEIVER USERS

Henry A. Rahmel, Evanston, Ill., assignor to A. C. Nielsen Company, Chicago, Ill., a corporation of Delaware Application April 27, 1956, Serial No. 581,209

14 Claims. (Cl. 346—17)

The present invention relates to systems and apparatus for determining the listening and/or viewing habits of users of wave signal receivers whether the wave signal receiver is a standard broadcast receiver, a frequency modulation receiver, or a television receiver. More specifically, the present invention relates to improvements in systems and apparatus for determining the audience popularity rating of different programs transmitted from one or more wave signal transmitters together with an improved system for accumulating information of importance in computing this audience popularity rating.

It has long been recognized that instrumented methods of determining the listening and/or viewing habits of wave signal receiver users are the only accurate way of getting the basic listening or viewing information from which the effectiveness of radio or television advertising can be determined. Such instrumented methods extensively employed by the assignee of the instant application have involved producing a continuous record of the operating condition of the wave signal receiver day in and day out for twenty-four hours a day so that every turn of the dial, every retune, every set turn-on and turn-off is recorded. In order to enable the making of a particularly accurate analysis of the drawing power of certain programs it is necessary to determine the type of person or persons who are attracted to them. Accordingly, it is desirable to obtain information concerning the audience composition when the monitored receivers are being used.

There are, of course, numerous non-instrumented methods of determining the effectiveness of radio and television advertising which involves making numerous telephone calls to determine what program the particular listener or viewer happens to be listening to or watching at the time the call is made and what the composition of the audience is at that time. Such systems obviously have very great shortcomings. There is not the slightest assurance that the wave signal receiver is being used in the manner indicated by the recipient of the call, since the recipient of the call may state any station merely to get rid of the caller. The post card system of obtaining such information has the same shortcomings and is, perhaps, even less accurate than the telephone call system.

It would be desirable to provide an arrangement which would give accurate data with regard to the listening or viewing audience with a minimum of effort on the part of the receiver users. Moreover, it would be desirable to provide a receiver attachment which would be relatively small in size and not unattractive in appearance and which would enable the user or users of a monitored receiver to quickly and accurately record the composition of the audience which is viewing the receiver at times prescribed by the statistical organization. For example, it would be desirable to record the audience composition for each particular program that is being listened to or viewed and, therefore, such a record could be made each time that the composition of the audience changes, as well as at each time that there is a program change either because of returning of the receiver or because of the normal periodic program changes. If information with respect to the audience composition is to be accumulated from a receiver having associated therewith a device which records the tuning condition of the receiver at all times, it would be desirable to provide at the receiver some mechanism with which the collaborator could indicate audience composition directly on the record.

Therefore, a principal object of the present invention is to provide a new and improved apparatus and system for enabling wave signal receiver users to easily and accurately record audience composition data.

Another object of the present invention is to provide a new and improved wave signal receiver monitoring system in which quality control means is provided for insuring that the receiver users record at the necessary times the composition of the audience.

Still another object of the present invention is to provide an audience composition recording means with associated quality control means for obtaining accurate information with regard to the listening and viewing habits of wave signal receiver users.

Still another object of the present invention is to provide a system in which accurate information may be obtained with regard to the listening habits of wave signal receiver users together with information apposite to the audience composition.

Further objects and advantages of the present invention will become apparent as the following description proceeds and the features of novelty which characterize the invention are pointed out with particularity in the claims annexed to and forming a part of this specification.

For a better understanding of the present invention reference may be had to the single figure of the accompanying drawing in which is schematically illustrated a particular embodiment of the present invention as used in conjunction with a television receiver.

Considered briefly, the above and further objects of the present invention are realized in connection with monitoring a wave signal receiver, illustrated in the drawing as a television receiver 9, by the provision of a receiver attachment generally designated as 10. As illustrated, the channel selector switch of receiver 9, schematically indicated as 11, is mechanically connected to a position switch generally indicated at 12. In this manner it is possible to produce in receiver attachment 10 an electric signal continuously and automatically indicative of the tuning condition of the receiver 9. This signal is preferably supplied to a group of channel identification styli 13 in a multiple styli recorder 14 included in receiver attachment 10. Obviously, the recorder 14 may be of any suitable type and the one illustrated is by way of example only. In addition, a push-button operated audience composition unit 15, also included in the receiver attachment 10, continuously supplies to a group of audience composition styli 16 in the recorder 14 a signal indicative of the composition of the audience viewing the program reproduced by receiver 9. For the purpose of assisting the receiver users in readjusting the device 15 whenever a change in audience composition occurs, a ratchet wheel actuated switching mechanism 18, included in receiver attachment 10, operates in conjunction with a release solenoid 19 in the device 15 to release all of the push-buttons each time that the receiver 9 is retuned. Also, a periodically actuated switching mechanism 20 is provided for automatically releasing the push-buttons after reoccurring intervals of suitable duration, such as, for example, every hour on the hour. Moreover, each time that the push-buttons in the device 15 have been autocatically released and the receiver is energized, a quality control circuit which includes a signal device 21 notifies the receiver users that the audience composition should be recorded by actuation of the push-buttons in the device 15. The signal device 21 remains active until the push-buttons have been actuated, at which time it is deenergized. In this manner, there is recorded on the recording medium 22 of the recorder 14 a twenty-four hour record of the stations to which the receiver 9 has been tuned as well as a record of the composition of the audience at substantially all times when the receiver 9 is in use. Since the station information and the audience composition information are simultaneously recorded on the record medium 22, it is a simple matter for the survey organization to correlate the programs and the types of audiences which view and/or listen to them.

As shown, in order to provide a unidirectional operating voltage for the units included in receiver attachment 10, there is provided a separate power supply unit 23 in the receiver attachment 10 which is adapted to be energized from across the primary winding of the power transformer 24 of the television receiver 9. Consequently, whenever the on-off switch 25 of the receiver 9 is closed to energize the receiver from across the secondary winding of the transformer 24, the power line terminals 26 of the receiver 9 are connected directly across the input terminals 27 of the power supply unit 23 so as to provide the necessary high unidirectional voltage with respect to ground at the +B terminal 28 thereof. Although in some instances it may be possible to energize the circuits of the receiver attachment 10 of the present invention from the receiver power supply, experience has proven it to be desirable to provide a separate power supply which is energized when and only when the associated receiver 9 is in operation.

The channel identification switch 12 may comprise any suitable position switch such as a rotary switch having a rotatable wiper contact 29 capable of selectively engaging a plurality of spaced contacts 30*a*, 30*b*, 30*c*, 30*d*, 30*e*, 30*f*, 30*g* and 30*h*. Obviously, the number of contacts may be more or less than those shown, but in any case each contact corresponds to a particular channel to which receiver 9 may be tuned. The movable wiper contact 29 of the channel identification switch 12 is directly connected to the +B terminal 28 of the power supply 23. Moreover, each of the contacts 30 is connected to one of the styli 13 which are preferably marked with the same subscript. Hence, contact 30*a* is connected to stylus 13*a*, contact 30*b* to stylus 13*b*, etc. Thus, the channel identification styli 13, which is connected to the particular contact 30 on which the wiper contact 29 is positioned, is energized. For example, when the wiper contact 29 is in the position shown, i.e., the station corresponding to contact 30*a* is tuned in by the tuner 11, and stylus 13*a* is energized. Thus, a record is made on the record receiving medium 22 at the location of stylus 13*a*.

Although any suitable type of recorder 14 may be used in the system of the present invention, the illustrated recorder includes a continuously energized motor driven capstan or drive roller 31 which moves the electro-sensitive recording medium 22 between the styli 13 and 16 and a metal platen 32 which is connected to ground as indicated at 33. The medium 22 is connected to ground as indicated at 33. The medium 22 is preferably an electro-sensitive paper such as that sold by Western Union under the name of TELADELTOS, and therefore, when any of the styli are supplied with the high unidirectional voltage from the power supply 23 the voltage gradient across the thickness of the record receiving medium 22 produces a mark thereon. It will be understood that current limiting resistors may be serially connected with the respective styli 13 and 16 where necessary. The record which is thus made is a plurality of lines parallel to the direction of travel of the medium 22, the locations of the lines produced by styli 13 across the width of the medium 22 being indicative of the channels tuned in by receiver 9 and the location of the lines produced by stylus 16 being indicative of the audience composition subjected to the program reproduced by receiver 9, the lengths of the lines in the direction of travel of the medium 22 being indicative of the time when such conditions as channels tuned in and audience composition occurred. Preferably, the drive roller 31 is driven from a constant speed motor such as 34 at a uniform speed with respect to time.

Before describing other parts of the control circuit of receiver attachment 10, a brief description of the audience composition unit 15 is believed to be in order. This unit has been schematically disclosed and may take any form. The important thing is a device which can be mechanically actuated by members of the audience of the wave signal receiver being monitored and which will automatically cause a record indicative of the audience composition to be produced. The device further includes means for periodically releasing the mechanically actuated means after certain elapsed periods of time, or when the tuning condition of the receiver is changed, and at certain other times when a likelihood of a change of audience composition might occur. The device 15, schematically illustrated in the drawing, is indicated as including a plurality of mechanically actuated push-buttons which have been designated as A, B, C and the like. It will be apparent that the push-button A could indicate a particular member of the family such as the head of the household. The push-button B might indicate the spouse of the head of the household, and the push-button C might indicate another member of the family. Additional push-buttons may be provided for indicating other members of the family. Of course, instead of push-buttons, one might well utilize some sort of dial which could be actuated to a position indicative of the particular audience composition. It is intended in the appended claims not to limit the audience composition unit to any specific construction, and the illustrated embodiment is by way of example only. In any event, the push-buttons A, B and C, as illustrated in the drawings, are individually actuable by members of the audience viewing the program reproduced by television receiver 9, and, when actuated, they remain actuated until certain conditions occur for actuating the release solenoid 19 referred to above. To this end each of the push-buttons A, B and C are indicated as being provided with a notch 35, which notch 35 cooperates with latching means 35*a*, one latching means being associated with each push-button. Whenever a particular push-button such as A, for example, is depressed, the latching means 35*a* will engage the notch 35 and hold the associated push-button in a depressed or actuated position. All of the latches 35*a* for the plurality of push-buttons A, B and C are mechanically interconnected by means of a mechanical link 19*a* connected to the armature of release solenoid or electromagnet 19. Upon energization of the electromagnet 19, all of the push-buttons A, B and C will be released simultaneously and must be reactuated to indicate the audience compositon for the subsequent period. As will be described in greater detail hereinafter, the push-buttons A, B and C also control certain electrical circuits including the energization of the styli 16, which are specifically designated in the drawing as 16A, 16B and 16C, etc.

In order to energize the release solenoid 19 for releasing the push-buttons A, B and C and in addition to energize the signal device 21 at the time that the receiver 9 is initially energized as well as at other times such as when the tuning condition is changed or upon the elapse of a predetermined time, a control circuit including switching relays 37 and 38 is provided. As shown, the winding 37*a* of the relay 37 is connected in parallel with the primary winding of the transformer 24 so that when the receiver on-off switch 25 is closed the relay 37 is energized. The relay 37 comprises a first set of make-before-break contacts 36, and a second set of make-before-break contacts 39 which are actuated by an operating armature and shunt bar 40 mechanically connected to the armature of relay 37. The shunt bar 40 is electrically connected to the +B terminal 28 of the power supply 23. With this arrangement, when the receiver 9 is first energized, which results in immediate energization of the relay 37, the contacts 36*a* and 36*b* of the set of contacts 36 which are biased closed are permitted to close whereupon the +B supply 23 is connected through the shunt bar 40 and a conductor 41 to the release solenoid 19. One terminal of the winding of release solenoid 19 is grounded as indicated at 42. The energization of release electromagnet 19 causes release of push-buttons A, B and C and movement to the position indicated in the drawing.

Further movement of the shunt bar 40 during the energization of relay 37 causes the former to engage contact 39*a* of the set of contacts 39 to connect the source of +B potential through a conductor 43 to a "set-on" stylus 44 in recorder 14 similar to the styli 13. This stylus will be energized to produce a record whenever receiver 9 is turned on regardless of the channel to which it is tuned. If channel styli 13 are not provided for every channel to which receiver 9 can be tuned, then stylus 44 will also provide information as to tuning to channels not specifically provided for in recorder 14. The engagement of shunt bar 40 with contact 39*a* will also momentarily complete a circuit from the +B source 23 through contact 39*b*, a conductor 45 and the pickup winding 38*a* of relay 38 to ground, indicated at 46. Additionally, it will complete the energization circuit of release solenoid 19 through a conductor 41*a* and the conductor 41. Further movement of shunt bar 40 upon energization of relay 37 causes interruption of the circuit controlled by contacts 39*a* and 39*b* which are moved out of electrical engagement thus deenergizing pickup winding 38*a* of relay 38. However, the relay 38 is provided with a holding coil 38*b* and associated holding contacts 47 for maintaining the relay 38 energized providing conditions are right in the audience composition unit 15 as described in greater detail hereinafter. If the push-buttons A, B and C are released as indicated in the drawing, then conditions are right for holding coil 38*b* to remain energized. As illustrated, the relay 37 is provided with a set of normally open contacts 48 connected in series with the contacts 47 and the holding coil 38*b* of relay 38.

To actuate the signal device 21 it is connected in series with the terminal 28 of the +B source through normally open contacts 50 provided on relay 38 and contacts 48 on relay 37. It may thus be seen that the signal device 21 is energized whenever the receiver 9 is energized and the relay 38 is picked up.

Considering now the holding circuit of the relay 38 in greater detail, it may be seen that the lower end of the hold winding 38*b* is serially connected with the set of normally open holding contacts 47, the set of normally open contacts 48 of the relay 37 to ground. Moreover, the upper end of the holding coil 38*b* of relay 38 is connected to terminal 28 of the +B source through a conductor 51 and the series connection of a plurality of normally closed switches 52, 53 and 54 in the device 15. Each of the switches 52, 53 and 54 is adapted to be opened when the associated push-button is actuated as is schematically indicated in the drawing. Accordingly, the signal device 21 is energized when the receiver 9 is first turned on since the release solenoid 19 is energized to release the push-buttons A, B and C in the device 15 when the pick-up winding 38*a* of the relay 38 is first energized. This circuit can readily be traced from the terminal 28 of the +B source through shunt bar 40, contact 39*a*, contact 39*b*, conductor 41*a*, conductor 41 and the winding of solenoid 19 to ground. Moreover, the signal device 21 remains energized by virtue of the fact that the relay 38 is held in a picked up position by the holding coil 38*b* until at least one of the push-buttons A, B, or C in the device 15 is actuated. Actuation of any one of the push-buttons opens the energizing circuit of the holding coil 38*b* at either or more of the switches 52, 53 or 54 thereby permitting the relay 38 to drop out and open contacts 47 and 50 which results in the turning off of the signal device 21. It will be understood that the contacts 48 can be omitted in the illustrated system wherein the power supply 23 is energized only when the receiver is turned on. These contacts may be desirable, however, where a battery is used for providing the +B voltage.

To energize the styli 16 only in dependence upon the push-buttons of device 15 which are actuated, the device 15 includes an additional set of normally open switches 56, 57 and 58 which connect respective ones of the styli 16 to the terminal 28 of the source of +B voltage whenever the corresponding push-button is actuated. For example, when the push-button designated by the letter A is actuated, the switch 56 is closed so as to connect the +B terminal 28 to that one of the styli 16 which is designated as 16A. Similarly, when the push-button B is actuated, the switch 57 is closed to provide an energizing voltage on the stylus designated as 16B so as to make a record on the record receiving medium 22. Obviously, since the power supply 23 is only energized when the receiver 9 is energized, no record is made on the medium 22 unless the receiver 9 is turned on.

It will be appreciated that when a change in tuning occurs it is desirable to obtain a new indication of the audience composition immediately following such tuning change. This can be accomplished by releasing the push-buttons A, B and C upon such tuning change and energizing the signal 21 to encourage manual actuation of the necessary push-buttons. Thus, for the dual purpose of releasing the push-buttons A, B and C in the device 15 and energizing the signal device 21 each time that the channel or station to which the receiver 9 is tuned is changed, there is provided the switching mechanism 18 which comprises a ratchet wheel type switch actuator 60 which is mechanically connected to the tuner 11 in the same manner as the position switch 12, so as to be rotatably positionable in accordance with the tuning condition of the receiver 9. The unit 18 further includes a normally open switch 61 which is momentarily closed upon the slightest change in tuning of receiver 9, so that as the tuner shaft is repositioned to retune the receiver 9 the switch 61 is closed for a short period of time. Since the switch 61 is serially connected with the winding of release solenoid 19 between the +B terminal 28 and ground through a conductor 62 and conductors 41*a* and 41, the push-buttons in unit 15 are released whenever ratchet wheel actuator 60 is operated. Furthermore, the pickup coil 38*a* of relay 38 is also serially connected with the switch 61 between the +B terminal 28 and ground so that during the time that the switch 61 is closed, the relay 38 is picked up. Since the switch 61 is closed for a period of time of the order of a tenth of a second, the push-buttons are released before the coil 38*a* is deenergized, thereby insuring that the holding coil 38*b* is energized to maintain the relay 38 picked up until the push-buttons are again actuated or, of course, the receiver 9 is turned off. The energization of relay 38 energizes the signal 21 which can be turned off only by reactuating the push-buttons or turning off receiver 9.

It has been found that for accurate recording of the audience composition, a check of such composition should be made at least once each hour. To this end, there is provided the periodically actuated switch mechanism 20 which includes a constant speed electric motor 63 connected in parallel with the primary winding of the transformer 24 so as to be energized only when the receiver 9 is energized. The motor 63 drives a switch actuating cam arrangement 64 for periodically energizing the contact 65 of the switch mechanism 20 with +B voltage. It will be understood that the schematically illustrated periodically operated switch mechanism 20 is by way of example only. Preferably the periodically actuated switch mechanism 20 may comprise the mechanism disclosed and claimed in Rahmel application Serial No. 417,478, filed March 19, 1954, now Patent No. 2,855,-993, granted October 14, 1958, and assigned to the same assignee as the instant application. In any event, it is important that the contacts 65 be momentarily energized once during each period of revolution of the cam 64 which, for practical purposes, is preferably once each hour. Obviously, the hour period is by way of example and shorter or longer periods may be employed.

As shown, the switching mechanism 20 includes a time actuated switch serially connected with the winding of release solenoid 19 between the +B terminal 28 and ground so that the push-buttons in the device 15 are released each time that the time actuated switch is closed. Moreover, the pickup coil 38a of the relay 38 is also controlled by the switching mechanism 20 which includes a switch connected between the +B terminal 28 and ground through conductors 41 and 41a so that the signal device 21 is also energized at the time that the push-buttons are released.

As described above, it would be desirable for the users of the receiver 9 to reposition the push-buttons in the device 15 whenever the composition of the audience changes. Obviously, this may occur at times other than when the receiver is retuned or when the switch 20 is actuated. Therefore, for the purpose of releasing the push-buttons so that a new setup may be made, a manually operable push-button switch 66 is connected to control the energization of the release solenoid 19 and the pickup coil 38a of relay 48. With this arrangement the users may easily release the push-buttons A, B and C when the audience composition changes during the midst of a program.

Although the operation of the system illustrated in the drawing will be clear from the foregoing description, the simplicity and advantages of this system will be made more evident from the following summarized description of the operation of the system in normal use. Let it be assumed that the receiver 9 is turned off, the push-buttons A, B, C, etc., are all released and the switch included in the switching mechanism 20 is open. When the receiver 9 is first energized by closing the on-off switch 25, the motor 63 is started and the relay 37 is picked up. As the relay 37 is picking up, +B voltage is supplied to the pickup coil 38a of the relay 38 through the shunt bar 40 and the set of contacts 36 of the relay 37, whereby relay 38 closes its two sets of normally open contacts 47 and 50. Relay 38 remains energized because of the fact that the holding coil 38b thereof is energized through the series connection of the contacts 48 of relay 37, contacts 47 of relay 38 and the contacts 52, 53 and 54 in the device 15. The user is thus notified by the quality control means, which includes the signal device 21, that he should actuate the proper one or ones of the push-buttons A, B, C, etc., to record audience composition data on the record receiving medium 22. When the user actuates any or all of the push-buttons, the holding coil 38b of relay 38 is deenergized thereby opening contacts 47 and 50 of relay 38 and deenergizing the signal device 21. At the same time that the audience composition data is being recorded through the action of the styli 16, a record is simultaneously being made of the tuning condition of the receiver 9 either by the channel styli 13 or by the "on-off" stylus 44. Generally, it is the "on-off" stylus 44 and one of the station styli 13 which simultaneously produce a record when the receiver is turned on. This record of channels tuned in and audience composition will be made with respect to time. A representative record produced by recorder 14 is indicated in the drawing.

If the tuner 11 is now repositioned so as to retune the receiver 9 for reception of a different station or channel, the position switch 12 causes a different stylus 13 to be rendered effective and also the rotation of the ratchet wheel 60 closes the switch 61 momentarily which energizes both the release solenoid 19 and the pickup coil 38a of the relay 38. Therefore, the push-buttons are released and the relay 38 energized to maintain the signal device 21 in an energized condition until one or more of the push-buttons are actuated. When the push-buttons have been actuated to record the audience composition data on the record receiving medium 22, the relay 38 and the signal device 21 are both deenergized. If, at this time, or shortly thereafter, the audience composition changes, the user or users may momentarily close the switch 66 to release the push-buttons A, B and C so that they may make a new setup in the unit 15 by actuating the proper ones of the push-buttons. After the receiver 9 has been operated for an hour from the time that the switching mechanism 20 was last actuated, a switch will be closed by the cam arrangement 64 to energize the release solenoid 19 and the pickup coil 38a of the relay 38. The signal device 21 is once more energized until one or more of the push-buttons are actuated.

Should it be desirable for the users to reposition the push-buttons at a particular calendar time such as, for example, once each hour on the hour, rather than at the end of each predetermined period of receiver use, the motor 63 should be connected directly across the power line rather than through the on-off switch 25 of the receiver 9. The manner in which the users of the receiver are periodically reminded to reposition the push-button depends upon a number of factors and either system may be used.

It may frequently happen that the users of the receiver 9 may want to actuate the push-buttons shortly before the time at which the switching mechanism 20 is to be rendered effective, in which case it might be annoying for them to have to return to the receiver in a few minutes to make the same setup in the push-button device 15 and to terminate the operation of the signal device 21. Accordingly, a time delay unit may be serially connected between the contact 65 of the switching mechanism 20 and the release solenoid 19 and also between the contact 65 and the pickup coil 38a of the relay 38. This time delay unit could be a dashpot type of time delay normally actuated to an open position at the time any or all of the push-buttons are actuated and would prevent effective operation of the circuit between the contact 65 of the switching mechanism 20 and both the release solenoid 19 and pickup coil 38a of relay 40 for a predetermined time after the actuation of the push-buttons A, B and C. For example, the time delay may be of the order of two or three minutes. Again, the actual time delay provided by such a device would depend upon a number of factors and preferably is adjustable.

In addition to utilizing the system of the present invention for recording the listening habits of wave signal receiver users, the system may be used for recording various individual preferences of the collaborators, i.e., collaborator voting. In accordance with one method of using the system for purposes of collaborator voting, additional buttons may be added to show the like or dislike by the audience or the individuals in the audience of the program being received. Moreover, in the event that the survey organization is wiling to forego the monitoring of the receivers during a particular time interval, the same buttons which are used for indicating audience composition may be used for purposes of collaborator voting. With either method, however, the important advantage which is achieved is that the record of the operating conditions of the receiver, the audience composition and the preferences of the audience are provided on a single record medium.

While the present invention has been described in connection with a particular embodiment thereof, it will be understood that those skilled in the art may make many changes and modifications without departing from the true spirit and scope of the invention which is intended to be covered by the appended claims.

What is claimed as new and desired to be secured by Letters Patent of the United States is:

1. A system for monitoring the use of a wave signal receiver, comprising recorder means operatively connected to said receiver for providing on a record receiving medium a record of an operating condition of said receiver with respect to time, manually operable means for recording the composition of the audience of said receiver on said recording medium, detecting means operative in response to energization of said receiver or the altering of an operating condition of said receiver, and quality control means operatively connected to the receiver for reminding the users of said receiver to operate said manually operable means, said quality control means being responsive to the operation of said detecting means to remind the users whenever said receiver is energized and whenever the operating condition of said receiver is altered, whereby use of this information by a survey organization for computing audience rating of programs is facilitated.

2. A system and apparatus for recording the listening and/or viewing habits of wave signal receiver users comprising means for continuously recording the operating condition of said receiver or detecting when said receiver for recording on the record receiving medium of said last mentioned means data indicative of the audience composition during use of said receiver, control means producing a control signal upon detecting a change in the tuning condition of said receiver or detecting when said receiver is first energized, and quality control means operable in response to the production of said control signal for providing an indication for reminding the user to use the push-buttons to record on the record receiving medium the audience composition.

3. A system and apparatus for recording the listening and/or viewing habits of wave signal receiver users comprising means for continuously recording the operating condition of said receiver, push-button actuating means for recording on the record receiving medium of said last mentioned means simultaneously with the recording of receiver operating condition information indicative of the audience composition, control means for detecting a change in the tuning condition of said receiver, and reminder means operable in response to operation of said control means for providing a signal for reminding the receiver user to actuate the push-buttons in accordance with the audience composition.

4. A system and apparatus for recording the listening and/or viewing habits of wave signal receiver users comprising recorder means operatively connected to said receiver for providing on a record receiving medium information indicative of the operating condition of said receiver, a manually operated unit for providing on said record receiving medium information indicative of the audience composition, detecting means for detecting predetermined changes in the operation of said receiver, quality control means operable only during energization of said receiver in response to operation of said detecting means to remind the receiver users to operate said unit, and means for rendering said quality control means inoperative after said unit has been operated.

5. A system and apparatus for recording the listening and/or viewing habits of wave signal receiver users comprising recorder means operatively connected to said receiver for providing on a record receiving medium information indicative of the tuning condition of said receiver, manually actuatable means for providing information indicative of the audience composition, detecting means for detecting predetermined changes in the operation of said receiver, and quality control means responsive to the operation of said detecting means to remind the receiver users at predetermined times during the energization of said receiver to actuate said manually actuatable means to record information indicative of the audience composition.

6. A system and apparatus for recording the listening and/or viewing habits of wave signal receiver users comprising recorder means operatively connected to said receiver for providing on a record receiving medium information indicative of the tuning condition of said receiver, push-button means for providing on said record receiving medium information indicative of the audience composition, quality control means operable when energized to remind the receiver users to push the buttons in said push-button unit, means connected to said receiver for energizing said quality control means under predetermined conditions only when said receiver is energized, and means responsive to the actuation of said push button unit for deenergizing said quality control means.

7. Monitoring apparatus comprising switch means adapted to be mechanically connected to the tuner of a television receiver for providing a signal indicative of the tuning condition of said receiver, a push-button audience composition control unit for providing an electric signal indicative of the audience composition as indicated by the particular push-buttons which are actuated, recorder means simultaneously responsive to said signals for recording both the tuning condition of the receiver and the audience composition at the time of receiver use, detecting means for detecting when the receiver is first turned on when the tuning thereof is changed and when a predetermined time interval of listening has elapsed, and reminder means operatively connected to said receiver and responsive to said detecting means for reminding the users of said wave signal receiver to actuate the push-buttons.

8. Monitoring apparatus comprising switch means mechanically connected to the tuner of a television receiver for providing a signal indicative of the tuning condition of said receiver, a push-button audience composition control unit for providing an electric signal indicative of the audience composition as indicated by the particular push-buttons which are actuated, recorder means simultaneously responsive to said set of electric signals for simultaneously recording both the operating condition of the receiver and the audience composition at the time of receiver use, detecting means for detecting when the tuning condition of said receiver is changed, quality control means for reminding the users of said wave signal receiver to actuate the push-buttons, said quality control means being responsive to the operation of said detecting means thereby to be rendered effective to remind whenever the tuning condition of said receiver is changed, and being operatively connected to said push-button control unit thereby to be rendered ineffective to remind when said push-buttons are actuated.

9. Apparatus for recording the audience composition of a wave signal receiver, comprising a push-button unit for recording on a continuously moving medium the audience composition, detecting means operatively associated with said receiver and operable to produce a control signal under predetermined conditions, and reminder means operable in response to the control signal produced by said detecting means but only when said receiver is turned on for reminding the receiver users to use the push-button unit to record the audience composition, said reminder being rendered ineffective to remind in response to the actuation of said push-button unit.

10. Apparatus for recording the audience composition of a wave signal receiver, comprising a manually operable unit for recording the audience composition, detecting means operatively associated with said receiver for producing a control signal under predetermined conditions, and quality control means operable in response to the control signal produced by said detecting means but only when said receiver is turned on for reminding the receiver users to actuate the manually operable unit to record information indicative of audience composition, said quality control means being ineffective to remind when said manually operable unit is actuated.

11. Apparatus for recording the audience composition of a wave signal receiver, comprising a manually operable unit for recording the audience composition, detecting means operatively associated with said receiver and operable under predetermined conditions to produce control signals, reminder means responsive to control signals produced by said detecting means only when said receiver is turned on for reminding the receiver users to use the manually operable unit to make a recording of audience composition, said reminder being ineffective to remind when said manually operable means is in an actuated condition, and means operable under other predetermined conditions for deactuating said manually operable means and for energizing said reminder means.

12. The apparatus of claim 9 wherein said predetermined conditions occur whenever the tuning condition of the receiver is changed, whenever said receiver is initially energized and at predetermined calendar times.

13. The apparatus of claim 9 wherein said predetermined conditions occur whenever the tuning condition of said receiver is changed.

14. Apparatus for recording the audience composition of a wave signal receiver, comprising recorder means for recording the operating condition of a receiver on a record medium, a manually operable unit including means for recording the audience composition on said medium concurrently with the recording of the operating condition of said receiver, said last-mentioned means including a plurality of switches for respectively completing input circuits to said recorder, a plurality of manually operable switch actuating means for respectively actuating said switches, detecting means for detecting predetermined changes in the operating condition of said receiver, an alarm device, and switch means actuated in response to operation of said detecting means for controlling the operation of said alarm device.

References Cited in the file of this patent

UNITED STATES PATENTS

| | | |
|---|---|---|
| 1,138,543 | Davis et al. | May 4, 1915 |
| 2,514,086 | Owens | July 4, 1950 |
| 2,649,498 | Ellett | Aug. 18, 1953 |
| 2,662,168 | Scherbatskoy | Dec. 8, 1953 |
| 2,709,636 | Owens | May 31, 1955 |
| 2,731,620 | Gottfried | Jan. 17, 1956 |

UNITED STATES PATENT OFFICE

CERTIFICATE OF CORRECTION

Patent No. 2,924,496 February 9, 1960

Henry A. Rahmel

It is hereby certified that error appears in the printed specification of the above numbered patent requiring correction and that the said Letters Patent should read as corrected below.

Column 1, line 72, for "returning" read -- retuning --; column 9, line 24, for "or detecting when said receiver" read -- , push-button actuated means --.

Signed and sealed this 9th day of August 1960.

(SEAL)
Attest:

KARL H. AXLINE
Attesting Officer

ROBERT C. WATSON
Commissioner of Patents